United States Patent Office 3,073,838
Patented Jan. 15, 1963

3,073,838
DERIVATIVES OF HYDROGENATED PYRIDONES
Hans Herbert Kühnis and Rolf Denss, Basel, and Conrad Hans Eugster, Wallisellen, Switzerland, assignors to Geigy Chemical Corporation, Ardsley, N.Y., a corporation of Delaware
No Drawing. Filed June 6, 1961, Ser. No. 115,082
Claims priority, application Switzerland June 7, 1960
6 Claims. (Cl. 260—297)

The present invention concerns processes for the production of new hydrogenated pyridones as well as the compounds obtained by these processes which have valuable pharmacological properties.

It has surprisingly been found that compounds are obtained of the general formula

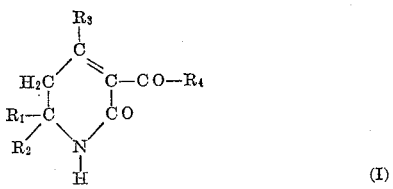

wherein
$R_1$ represents a hydrocarbon radical,
$R_2$ represents a hydrocarbon radical which can also be bound with $R_1$ to form an alkylene radical having 4–7 carbon atoms,
$R_3$ represents a radical corresponding to the definition of $R_1$, in particular an alkyl, aryl or aralkyl radical, and
$R_4$ represents a low alkyl or an aryl radical,
if a 5-substituted isoxazole of the general formula

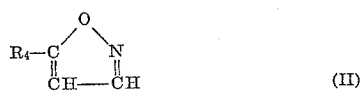

is condensed with a compound which can be converted by means of a mineral acid into a carbonium ion of the general formula

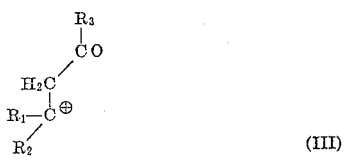

In the compounds of the general Formula I, $R_1$ and $R_2$ independently of each other can be, for example, methyl, ethyl, n-propyl, isopropyl, n-butyl, isobutyl, tert. butyl, cyclopropyl, cyclopentyl, cyclohexyl, phenyl, p-methylphenyl, benzyl, p-isopropylbenzyl, $\beta$-phenylethyl or $\gamma$-phenylpropyl radicals, and $R_1$ and $R_2$ together can be, for example, the tetramethylene, pentamethylene, hexamethylene or heptamethylene radical. $R_3$ is, for example, a methyl, ethyl, n-propyl, isopropyl, n-butyl, isobutyl, tert. butyl, isoamyl, phenyl, benzyl or $\beta$-phenylethyl radical and $R_4$ is, for example, a methyl, ethyl, n-propyl, isopropyl, n-butyl, tert. butyl or phenyl radical.

In particular, $\alpha,\beta$-unsaturated ketones of the general Formula IV

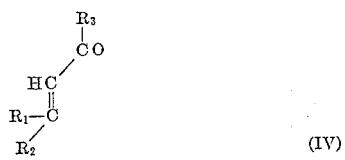

$\beta$-hydroxyketones of the general Formula V

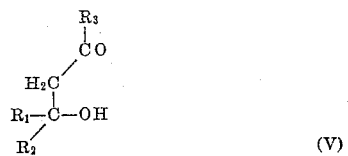

and $\beta$-halogen ketones of the general Formula VI

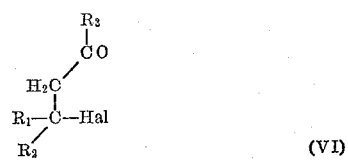

wherein Hal represents a halogen atom, in particular chlorine or bromine and $R_1$, $R_2$ and $R_3$ have the meanings in Formulae IV–VI as given above, are used as compounds which can be converted into a carbonium ion of the general Formula III. The condensation is performed, for example, in concentrated mineral acids such as concentrated sulphuric acid or polyphosphoric acid, at low temperatures, preferably under or about 0°. However, instead of a mineral acid as reaction medium, glacial acetic acid, for example, can be used to which is added simply a slight amount of mineral acid, e.g. sulphuric acid, as condensing agent. In this case, the condensation is performed, for example, at room temperature.

It has also been found that compounds which can be converted into a carbonium ion of the general formula

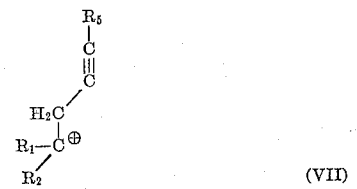

wherein $R_5$ represents hydrogen or a radical corresponding to the definition of $R_1$, and $R_1$ and $R_2$ have the meanings given above, can react with 5-substituted isoxazoles of the general Formula II in a manner similar to the keto compounds of the general Formulae IV–VI. Thus, compounds of the general Formula I are also obtained with the exception of those in which $R_4$ is an aromatic radical, by condensing, by means of a mineral acid, a 5-substituted isoxazole of the general Formula II with a compound which can be converted into a carbonium ion of the general Formula VII to form a compound of the general formula

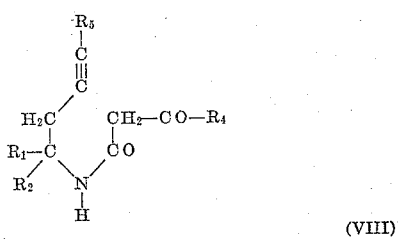

and converting the latter by treatment with sulphuric acid which contains a mercury salt, e.g. mercury-(II)-sulphate, into a compound of the general Formula I.

In particular, those compounds of the general formula

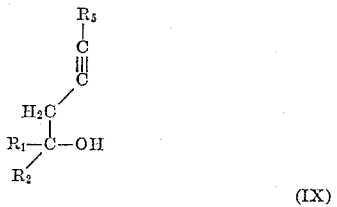

(IX)

wherein $R_1$, $R_2$ and $R_5$ have the meanings given above, can be used as compounds which can be converted into a carbonium ion of the general Formula VII.

The first reaction step can be performed under conditions which are quite analogous to those for the condensation mentioned above of isoxazoles of the general Formula II with keto compounds of the general Formulae IV–VI. The second reaction step comprises addition of water and condensation with ring closure.

Compounds of the general Formula I can also be obtained direct if a 5-substituted isoxazole of the general Formula II is condensed with a compound which can be converted by means of sulphuric acid, advantageously sulphuric acid monohydrate, which contains a mercury salt, into a carbonium ion of the general Formula VII. This reaction also is preferably performed at temperatures of about 0°.

Finally, compounds of the general Formula I are obtained if compounds of the general formula

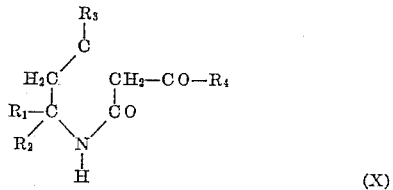

(X)

wherein $R_1$, $R_2$, $R_3$ and $R_4$ have the meanings given above, or their acetals, enolethers or enolesters are treated with an acid or basic condensing agent. As, for example, in the first process mentioned above, concentrated mineral acids or acetic acid containing mineral acid can be used, ae temperatures between 0° and room temperature, as acid condensing agents. Organic bases such as piperidine or triethylamine for example, are suitable as basic condensing agents. The latter reaction is performed in the presence or absence of organic solvents such as, e.g. ethanol, preferably at room temperature to boiling temperature of the solvent used.

Numerous 5-substituted isoxazoles of the general Formula II which are necessary starting materials for the first and second production processes are known and others can be produced in an analogous manner.

Starting materials of the general Formula IV are, for example, mesityl oxide and homologues thereof. Starting materials of the general Formula IX can be produced, for example by condensing ketones of the general formula

(XI)

in many various ways with possibly substituted propargyl magnesium halides of the general formula

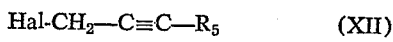

(XII)

wherein $R_1$, $R_2$, $R_5$ and Hal have the meanings given above.

Starting materials of the general Formula X are obtained, for example, by condensing substituted isoxazoles of the general Formula II with compounds of the general Formula IV by means of concentrated mineral acids such as concentrated sulphuric acid or polyphosphoric acid. This condensation is performed at lower temperatures, i.e. under analogous but somewhat milder reaction conditions than in the first process mentioned for the production of compounds of the general Formula I.

In the first production process it is also possible under mild reaction conditions, in some cases to isolate as further intermediate products compounds of the general formula

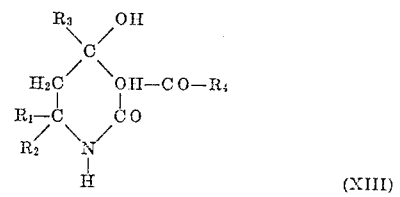

(XIII)

wherein $R_1$, $R_2$, $R_3$ and $R_4$ have the meanings given above. These compounds are, at the same time, intermediate products for the third process mentioned and, thus, they can also be converted into end products of the general Formula I by splitting off water with the other acid and basic condensing agents used in that process.

Compounds embraced by the general formula X of the restricted formula

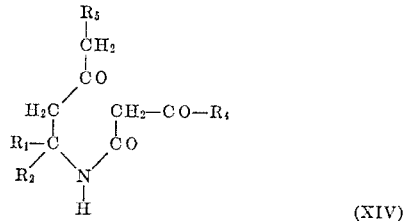

(XIV)

wherein $R_1$, $R_2$, $R_4$ and $R_5$ have the meanings given above, are also presumed to be intermediate products for the second process mentioned.

The compounds of the general Formula I have valuable pharmacological properties, in particular analgetic, antipyretic and antiphlogistic activity.

The compounds of general Formula I can be used as analgesics and anti-inflammatory agents for the relief of painful conditions and for the treatment of rheumatic disorders. They can be administered perorally in the form of tablets, gragées or capsules. They can also be incorporated into semi-solid substances which melt within a suitable range, e.g. cocoa butter, to form suppositories for rectal administration. They may also be combined with other therapeutically useful substances.

The following examples further illustrate the production of compounds of the general Formula I according to the invention but are by no means the only methods of producing same. Parts are given therein as parts by weight and their relationship to parts by volume is as that of grammes to cubic centimetres. The temperatures are in degrees centigrade.

*Example 1*

A mixture of 83 parts of 5-methyl-isoxazole and 98 parts of mesityl oxide is cooled to 0°, 170 parts of concentrated sulphuric acid are slowly added while stirring and continuously cooling with ice, whereupon the whole is left for two days at —5°. After 24 hours the solution, which was deep grown at the beginning, has solidified. The mass is worked up by first stirring with ice water and then pouring into the amount of ice cold 5 N-caustic potash solution necessary to neutralise. The substance which immediately separates as an oil solidifies quickly. It is filtered off, washed with a little water and filtered off under suction until it is air-dry. The reaction product is isolated by boiling out the filter residue with acetone, whereupon it dissolves and inorganic portions remain undissolved. After recrystallisation from acetone, the 3-acetyl-4,6,6-trimethyl-5,6-dihydro-pyridone-(2) melts at 144-145°. It can also be recrystallised for example, from boiling water or it can be sublimated at 0.01 Torr/140°.

Example 2

1.96 parts of mesityl oxide and 1.66 parts of 5-methyl-isoxazole are mixed at −15° with 5 parts of polyphosphoric acid and the mixture is left to stand for 2 days at −5°. It is then stirred with ice water, poured into the amount of ice cold 5 N-caustic potash solution necessary to neutralise and the oil which separates is taken up in ether. The ether solution is dried with sodium sulphate, concentrated and the residue is distilled. The 3-acetyl-4,6,6-trimethyl-5,6-dihydro-pyridone-(2) passes over at 110–120° under 0.01 mm. pressure. The distillate crystallises from acetone or ether; M.P. 144–145°. Its melting point when mixed with the substance of Example 1 is 143–145°.

Example 3

1.96 parts of mesityl oxide and 1.66 parts of 5-methyl-isoxazole are mixed while cooling with 10 parts by volume of glacial acetic acid and a few drops of concentrated sulphuric acid. The mixture is then left to stand for 2 days at room temperature whereupon the product is worked up as described in Example 2. After distilling off a previous fraction under high vacuum, the 3-acetyl-4,6,6-trimethyl-5,6-dihydro-pyridone-(2) crystallises. M.P. 144–145°.

Example 4

(a) A mixture of 5 parts of 2-methyl-4-pentine-2-ol and 4.2 parts of 5-methyl-isoxazole is added dropwise at −15° to 10 parts of concentrated sulphuric acid and the whole is left to stand for 2 days at −5°. After the addition of a little ice, neutralising with potash lye and extracting with methylene chloride and evaporating off the solvent, an oil is obtained which boils at 0.001 Torr/115–125°. This is the still not quite pure 2-methyl-2-acetoacetamido-pentine-(4).

(b) To close the ring, 0.05 part of mercuric sulphate is dissolved in 10 parts by volume of concentrated sulphuric acid, a few drops of water are added and then, while cooling, the reaction product of (a) is added. The reaction mixture is left to stand for 2 days at 0°, neutralised with 5 N-potash lye and worked up analogously to Example 1 whereupon the compound described in that example is obtained.

Example 5

4.48 parts of 3-methyl-5-hexine-3-ol and 3.32 parts of 5-methyl-isoxazole are added at −15° while stirring to a solution of 10 parts by volume of sulphuric acid monohydrate and 0.05 part of mercuric sulphate. The reaction mixture is allowed to stand for 2 days at −5°, it is then stirred with ice water and poured into 75 parts by volume of ice cold 5 N-caustic potash solution. The aqueous solution is extracted with ether, the ethereal solution is dried with sodium sulphate and concentrated. The residue crystallises and is recrystallised from ether whereupon 3 - acetyl-4,6-dimethyl-6-ethyl-5,6-dihydropyridone-(2) is obtained; M.P. 121°, B.P. 139°/0.01 mm.

The following compounds, for example, are obtained in an analogous manner:

3-acetyl-4,6,6-trimethyl-5,6-dihydro-pyridone-(2), M.P. 144–145°,
3-acetyl-4-methyl-6,6-diethyl-5,6-dihydro-pyridone-(2), M.P. 87°,
3-acetyl-4,6-dimethyl-6-isopropyl-5,6-dihydro-pyridone-(2), M.P. 110–111°,
3-acetyl-4,6-dimethyl-6-isobutyl-5,6-dihydro-pyridone-(2), M.P. 87°,
3-acetyl-4-methyl-6,6-heptamethylene-5,6-dihydro-pyridone-(2), M.P. 153–154°,
3-acetyl-4-methyl-6,6-di-isobutyl-5,6-dihydro-pyridone-(2), M.P. 130–131°,
3-acetyl-4-methyl-6,6-tetramethylene-5,6-dihydro-pyridone-(2), M.P. 134°,
3-acetyl-4-methyl-6,6-pentamethylene-5,6-dihydro-pyridone-(2), M.P. 131°,
3-acetyl-4-methyl-6,6-hexamethylene-5,6-dihydro-pyridone-(2), M.P. 141°,
3-acetyl-4,6-dimethyl-6-benzyl-5,6-dihydro-pyridone-(2), M.P. 148–150°,
3-acetyl-4-methyl-6-ethyl-6-phenyl-5,6-dihydro-pyridone-(2), M.P. 169–171°,
3-acetyl-4,6-dimethyl-6-tert. butyl-5,6-dihydro-pyridone-(2), M.P. 123–125°,
3-acetyl-4,6-dimethyl-6-phenyl-5,6-dihydro-pyridone-(2), M.P. 167–169°.

Example 6

1.52 parts of 1-[1′-hydroxy-cycloheptyl-(1′)]-propine-(2) and 0.83 part of 5-methyl-isoxazole are mixed at −15° with 8 parts of polyphosphoric acid, 0.05 part of mercuric sulphate and a few drops of water and the mixture is left to stand for 2 days at −5°. It is then worked up as described in Example 2, whereupon 3-acetyl-4-methyl - 6, 6- hexamethylene-5,6-dihydro-pyridone-(2) is obtained, M.P. 139–141°, B.P. $_{0.01}$ 120–135°. Its melting point when mixed with the substance obtained according to Example 5 is 139–140°.

Example 7

5.37 parts of 2-methyl-2-bromopentanone-(4) are stirred at 0° with 2.49 parts of 5-methyl-isoxazole and 5.1 parts by volume of concentrated sulphuric acid and the mixture is left to stand for 2 days at −5°. The reaction mixture is then neutralised, while stirring, with 5 N-caustic potash solution and the neutral aqueous solution is extracted with ether, the ether solution is dried and concentrated. Crystallised from ether, the 3-acetyl-4,6,6-trimethyl-5,6-dihydro-pyridone-(2) melts at 144°. Its melting point when mixed with the substance of Example 1 is 143–144°.

Example 8

21 parts of 2-methyl-heptene-2-one-4, 13.83 parts of 5-methyl-isoxazole and 15.4 parts by volume of concentrated sulphuric acid are stirred at −5° and then left to stand for 3–4 days at −5°. The reaction mixture is then stirred with ice, made alkaline with 5 N-sodium hydroxide solution while cooling and the aqueous solution is extracted with ether. The ether solution is dried and concentrated whereupon 3-acetyl-4-propyl-6,6-dimethyl-5,6-dihydro-pyridone-(2) crystallises out, M.P. 109–110°.

The following compounds, for example, are obtained in an analogous manner:

1-acetyl-4-ethyl-6,6-dimethyl-5,6-dihydro-pyridone-(2), M.P. 120–122°,
3-acetyl-4-isopropyl-6,6-dimethyl-5,6-dihydro-pyridone-(2), M.P. 125–127°,
3-acetyl-4-benzyl-6,6-dimethyl-5,6-dihydro-pyridone-(2), M.P. 142–144°.

Example 9

(a) 29.75 parts of 2-methyl-octene-2-one-4, 17.65 parts of 5-methyl-isoxazole and 19.6 parts by volume of concentrated sulphuric acid are stirred at −5° and then left for 1 day to stand at −5°. The reaction mixture is then stirred with ice, made alkaline, while cooling, with 5 N-sodium hydroxide solution and the aqueous solution is extracted with ether. The ether solution is dried and concentrated. The oil which remains boils at 134°/0.02 Torr. It is 2-methyl-2-acetoacetamido-octanone-4.

(b) To close the ring, 20.2 parts of the product mentioned above and 9.6 parts of piperidine in 100 parts by volume of alcohol are refluxed for 15 hours. After evaporating, the 3-acetyl-4-butyl-6,6-dimethyl-5,6-dihydro-pyridone-(2) crystallises from acetone-ether, M.P. 78°.

3 - acetyl - 4 - isopropyl - 6,6 - dimethyl - 5,6 - dihydro-pyridone-(2) (M.P. 125–127°) is obtained in an analogous manner.

Example 10

5 parts of 2,5-dimethyl-2-acetoacetamido-hexanone-4, produced analogously to Example 9(a), are added while cooling and stirring to 10 parts by volume of concentrated sulphuric acid and the whole is left to stand for 3 days at —5°. The reaction mixture is stirred with ice, made alkaline with 5 N-sodium hydroxide solution while cooling and extracted with ether. The ether solution is dried and concentrated whereupon 3-acetyl-4-isopropyl-6,6-dimethyl-5,6-dihydro-pyridone-(2) crystallises. M.P. 125–127° (see Example 9).

*Example 11*

9.4 parts of 2-methyl-2-hydroxy-heptanone-4-ethylene ketal, 4.15 parts of 5-methyl-isoxazole and 20 parts by volume of concentrated sulphuric acid are stirred at —5° and left to stand for 2 days at this temperature. The reaction mixture is poured onto ice, made alkaline with 5 N-sodium hydroxide solution while cooling and extracted with ether. The ether solution is dried and concentrated whereupon the 3-acetyl-4-propyl-6,6-dimethyl-5,6-dihydro-pyridone-(2) crystallises. M.P. 109–110°.

The following compounds, for example, are obtained in an analogous manner:

3-acetyl-4-ethyl-6,6-dimethyl-5,6-dihydro-pyridone-(2), M.P. 120–122°,
3-acetyl-4-phenyl-6,6-dimethyl-5,6-dihydro-pyridone-(2), M.P. 160–162°.

EXAMPLE 12

(a) 9.8 parts of mesityl oxide, 11.1 parts of 5-propyl-isoxazole and 11.5 parts by volume of concentrated sulphuric acid are stirred at —15° and left to stand for 20 hours at —5°. The reaction mixture is then stirred with ice and made alkaline with 5 N-sodium hydroxide solution while cooling, extracted with ether and the ether solution is concentrated whereupon the 3,4,5,6-tetrahydro-3-butyryl-4-hydroxy-4,6,6-trimethyl-pyridone-(2) crystallises, M.P. 140–141°.

(b) 12 parts of the product mentioned above, 5.7 parts by volume of piperidine and 60 parts by volume of anhydrous alcohol are refluxed for 15 hours. After evaporating the solvent, the residue is recrystallised from ether. The 3-butyryl-4,6,6-trimethyl-5,6-dihydro-pyridone-(2) melts at 70–71°.

EXAMPLE 13

14.72 parts of mesityl oxide, 21.8 parts of 5-phenyl-isoxazole and 19.5 parts by volume of concentrated sulphuric acid are stirred at —10° and left to stand for 5 days at —5°. The reaction mixture is then poured onto ice and the pH is adjusted to 7 with 5 N-sodium hydroxide solution while cooling. A white product precipitates which is filtered off and recrystallised from acetone. The 3-benzoyl-4,6,6-trimethyl-5,6-dihydropyridone-(2) so obtained melts at 158–159°.

EXAMPLE 14

(a) 14.72 parts of mesityl oxide, 21.8 parts of 5-phenyl-isoxazole and 19.5 parts by volume of concentrated sulphuric acid are stirred at —10° and left to stand for 2 days at —5°. The reaction mixture is then poured onto ice, made alkaline with 5 N-sodium hydroxide solution while cooling, extracted with ether, the ether solution is dried and concentrated whereupon the 3,4,5,6-tetrahydro-3-benzoyl-4-hydroxy-4,6,6-trimethyl pyridone-(2) crystallises, M.P. 148–150°.

(b) 5.3 parts of the product mentioned above and 10.6 parts by volume of concentrated sulphuric acid are left to stand for 15 hours at 20°. The product is worked up as described in Example 13. The 3-benzoyl-4,6,6-trimethyl-5,6-dihydro-pyridone-(2) melts at 158–159°.

EXAMPLE 15

(a) 18.9 parts of 3-ethyl-5-hexine-3-ol, 21.8 parts of 5-phenyl-isoxazole, 49 parts by volume of concentrated sulphuric acid and 250 mg. of mercury-(II)-sulphate are stirred at —10° and left to stand for 2 days at —5°. The reaction mixture is then poured onto ice, made alkaline with 5 N-sodium hydroxide solution while cooling and extracted with ether. The ether solution is dried and concentrated whereupon the 3,4,5,6-tetrahydro-3-benzoyl - 4 - hydroxy-4-methyl-6,6-diethyl - pyridone-(2) crystallises, M.P. 113–117°.

(b) 5.8 parts of the above product and 11.6 parts by volume of concentrated sulphuric acid are left to stand for 15 hours at 20°. The product is worked up as described above. The 3-benzoyl-4-methyl-6,6-diethyl-5,6-dihydro-pyridone-(2) melts at 137–138°.

What we claim is:

1. A compound of the formula.

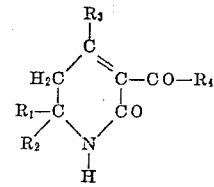

wherein $R_1$ alone is a member selected from the group consisting of lower alkyl, phenyl and benzyl, $R_2$ alone is a member selected from the group consisting of lower alkyl, phenyl and benzyl, and $R_1$ and $R_2$ taken together are alkylene having at least four and at most 7 carbon atoms, $R_3$ is a member selected from the group consisting of lower alkyl, phenyl and benzyl, and $R_4$ is a member selected from the group consisting of lower alkyl and phenyl.

2. 3-acetyl-4,6,6-trimethyl-5,6-dihydropyridone-(2).

3. 3 - acetyl-4,6-dimethyl-6-ethyl-5,6-dihydropyridone-(2).

4. 3 - acetyl-4-methyl-6,6-diethyl-5,6-dihydropyridone-(2).

5. 3-acetyl - 4 - isopropyl-6,6-dimethyl-5,6-dihydropyridone-(2).

6. 3 - acetyl-4-ethyl-6,6-dimethyl-5,6-dihydropyridone-(2).

No references cited.